United States Patent
Hendel

(10) Patent No.: US 8,934,483 B2
(45) Date of Patent: Jan. 13, 2015

(54) DATA CENTER SWITCH

(75) Inventor: Ariel Hendel, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 393 days.

(21) Appl. No.: 13/235,080

(22) Filed: Sep. 16, 2011

(65) Prior Publication Data

US 2012/0189004 A1 Jul. 26, 2012

Related U.S. Application Data

(60) Provisional application No. 61/434,794, filed on Jan. 20, 2011.

(51) Int. Cl.
*H04L 12/50* (2006.01)
*H04L 12/931* (2013.01)
*H04L 12/933* (2013.01)
*H04Q 11/00* (2006.01)

(52) U.S. Cl.
CPC .............. *H04L 49/40* (2013.01); *H04L 49/15* (2013.01); *H04L 49/352* (2013.01); *H04L 49/356* (2013.01); *H04L 49/45* (2013.01)
USPC .......................................... 370/360; 370/386

(58) Field of Classification Search
None
See application file for complete search history.

(56) References Cited

U.S. PATENT DOCUMENTS

| | | | |
|---|---|---|---|
| 7,218,640 B2 | 5/2007 | Lebizay et al. | |
| 7,873,056 B2 | 1/2011 | Higuchi et al. | |
| 2003/0021223 A1* | 1/2003 | Kashyap | 370/217 |
| 2010/0014526 A1* | 1/2010 | Chavan et al. | 370/395.53 |
| 2010/0061391 A1 | 3/2010 | Sindhu et al. | |
| 2011/0023114 A1* | 1/2011 | Diab et al. | 726/22 |
| 2011/0032944 A1 | 2/2011 | Elzur et al. | |
| 2011/0072427 A1* | 3/2011 | Garmark | 718/1 |
| 2011/0202682 A1* | 8/2011 | Wu et al. | 709/244 |
| 2011/0261828 A1* | 10/2011 | Smith | 370/401 |

FOREIGN PATENT DOCUMENTS

| | | |
|---|---|---|
| CN | 1695130 A | 11/2005 |
| CN | 101061680 A | 10/2007 |
| WO | WO 2010/090838 A2 | 8/2010 |

OTHER PUBLICATIONS

European Search Report for Application No. 12000035.1-2416 dated May 15, 2012, four (4) pages.

(Continued)

*Primary Examiner* — Eunsook Choi

(74) *Attorney, Agent, or Firm* — Sterne, Kessler, Goldstein & Fox P.L.L.C.

(57) ABSTRACT

A method of transferring data in a network is provided. Data is received at a sub-switch of a first bundled switch having a plurality of sub-switches, the sub-switch being configured to only couple to connections external to the first bundled switch. The method also includes transferring the data from the first bundled switch using a multi-lane cable coupled to a second bundled switch, a first end of the multi-lane cable coupled to a sub-switch in the first bundled switch and a second end of the multi-lane cable coupled to at least two sub-switches in the second bundled switch.

19 Claims, 12 Drawing Sheets

(56) References Cited

OTHER PUBLICATIONS

Nathan Farrington et al. "*Data Center Switch Architecture in the Age of Merchant Silicon*," High Performance Interconnects, 2009. HOTI 2009. 17th IEEE Symposium On, IEEE, Piscataway, NJ, USA, Aug. 25, 2009, pp. 93-102, XP031528533, ISBN: 978-0-7695-3847-1.

Office Action for Chinese Patent Application No. 201210013785.7, mailed on Jun. 16, 2014.

* cited by examiner

DATA CENTER SWITCH

CROSS-REFERENCE TO RELATED APPLICATIONS

This patent application claims the benefit of U.S. Provisional Patent Application No. 61/434,794 filed on Jan. 20, 2011, entitled "Data Center Switch," which is incorporated by reference herein in its entirety.

FIELD OF THE INVENTION

The present invention generally relates to switching in a computer network.

BACKGROUND OF THE INVENTION

With the increased demand for "cloud based" applications, the demand for very large server infrastructure capable of hosting distributed applications has increased. Networks capable of handling large-scale, multiple distributed applications on the same infrastructure are often termed "cloud computing networks" or simply "cloud networks."

Current approaches to cloud computing networks generally involve the creation of large multi-stage fabrics using the same switch building block, typically a merchant market switch ASIC with sufficient radix to span the entire network with a reasonable number of tiers or stages.

One challenge in the conventional implementation of cloud networks involves deployment and scalability of the multitude of discrete switch boxes along with the wiring necessary to interconnect them. Adding new servers and aggregation switches can involve the time-consuming wiring and rewiring of different network components. Another challenge in the conventional implementation of cloud networks is the cost associated with acquisition and maintenance of the above-noted components and wiring.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

Figure 10:
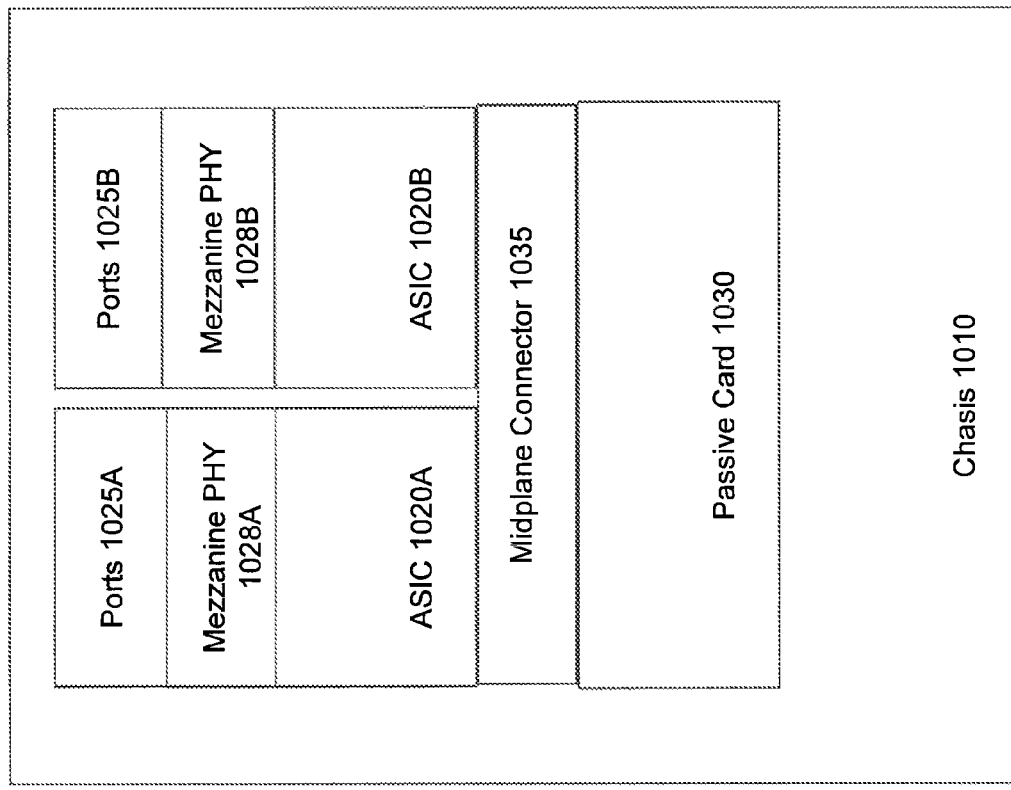

FIG. 10 provides a block diagram of a cloud switch having mezzanine PHYs, a passive card and a midplane connector, according to an embodiment.

Figure 11:
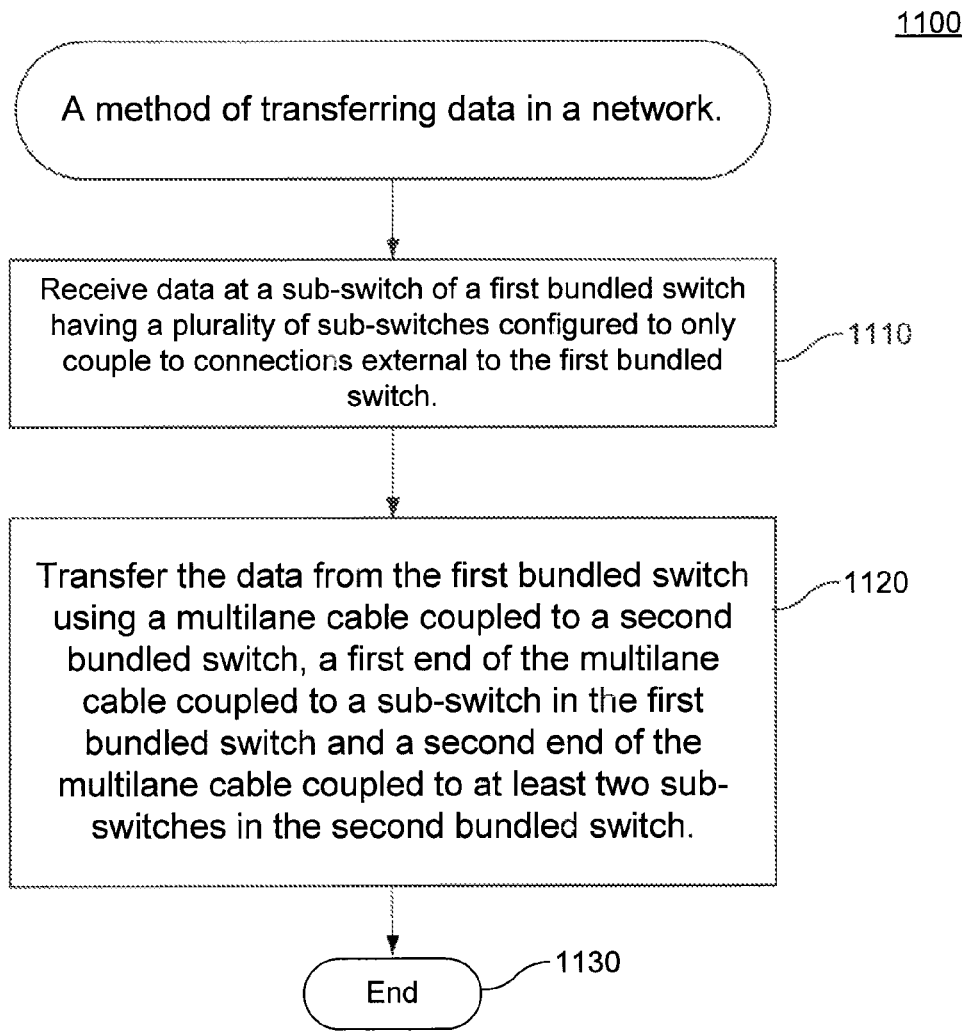

FIG. 11 provides a flowchart of an example method of transferring data in a network.

The invention is described with reference to the accompanying drawings. The drawing in which an element first appears is typically indicated by the leftmost digit(s) in the corresponding reference number.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Features and advantages of the invention are set forth in the description that follows, and in part are apparent from the description, or may be learned by practice of the invention. The advantages of the invention are realized and attained by the structure and particularly pointed out in the written description and claims hereof as well as the appended drawings. The following detailed description is exemplary and explanatory and is intended to provide further explanation of the invention as claimed.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one skilled in the art to effect such feature, structure, or characteristic in connection with other embodiments, whether or not explicitly described.

Overview

Generally speaking, some embodiments described herein provide an improved approach to implementing large scale network fabrics built out of more than one switch tier. Such networks are often suitable for use as "Cloud Computing Networks," very large server infrastructure having multiple tiers of switches and capable of hosting distributed applications (also termed "cloud applications"). As commonly implemented, cloud networks host multiple distributed applications oh the same network infrastructure.

Improved approaches described herein use "cloud switches." A cloud switch generally has multiple sub-switches in a single enclosure. Each sub-switch can perform the functions of a conventional network switch. The sub-switches described herein generally have connectors that are able to connect to external multi-lane cables (also termed bundled cables). In optical connections, multi-lane cables can be termed "parallel optics." In a multi-lane cable, a "lane" is a transmission path in the cable that corresponds to the transmission capabilities of a conventional cable. Thus, a four lane ML cable has four times the connection capability of a standard network cable.

Sub-switches in cloud switches as described herein can be implemented in different ways, including using a switch application specific integrated circuit (also termed herein switch ASIC, or ASIC). Example cloud switches described herein have multiple switch ASICs, and each ASIC having multiple ports for coupling to other network components using different configurable network fabrics. It should also be noted that, in an embodiment, sub-switches are not locally interconnected within the physical enclosure of a cloud switch.

Network cable interconnections described herein generally use multi-lane cables to link cloud switches in a network. An example of a multi-lane cable used herein is a quad optical or copper cable terminated by Quad SFP transceiver pluggable module. Quad SFP refers to a connector/transceiver specification that uses four transmission lanes per direction and is connected to a QSFP transceiver.

Unless stated otherwise, examples herein use Quad-SFP multilane cables. One having skill in the relevant art(s), given the description herein, would appreciate that cloud switches and multi-lane cables can be used with different numbers of ASICs, ports and transmission lanes, without departing from the spirit of approaches described herein.

An example network topology that can benefit from the use of cloud switches is the "fat-tree" network topology. This topology typically has homogenous components and has multiple tiers with a connectivity requirement that every switch be coupled to every other switch in an adjacent tier. As discussed below, using some embodiments described herein can significantly improve the implementation, maintenance and expansion of fat-tree networks.

Cloud Switches

Figure 1:
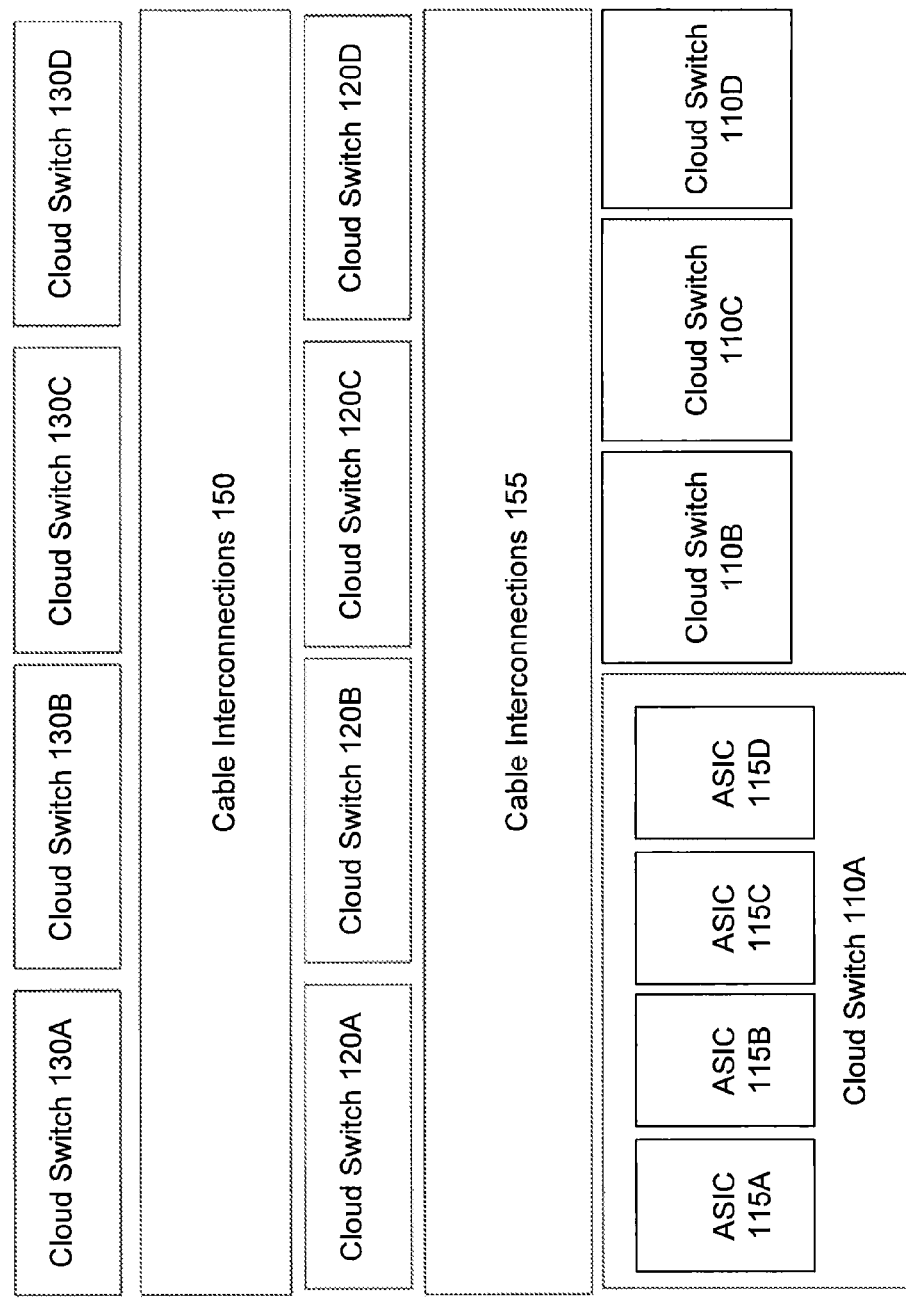
FIG. 1 is a block diagram of a sample network architecture having cloud switches coupled by cable interconnections, according to an embodiment.

FIG. 1 is a block diagram of a sample network topology having three tiers of cloud switches coupled by cable interconnections. Network topology 100 has a first tier of cloud switches 110A-D coupled via cable interconnections 155 to a second tier of cloud switches 120A-D. The second tier of cloud switches is coupled via cable interconnections 150 to a third tier of cloud switches 130A-D. To illustrate aspects of an embodiment, cloud switch 110A has additional detail, showing ASICs 115A-D. Each other cloud switch shown on FIG. 1, also includes four ASICs (not shown). However, any number of ASICs may be included in each cloud switch.

As compared to a conventional approach to implementing a multi-tier mesh network, each ASIC 115A-D replaces a discrete switch box. Thus, cloud switch 110A, having ASICs 115A-D, replaces four switch boxes in a conventional implementation. As noted above, each cloud switch in FIG. 1 also includes four ASICs, such ASICs also replacing discrete switch boxes on each tier.

Cable interconnections 150 and 155 use the multi-lane cables described above as an approach to coupling the tiers of network topology 100. Following the approach outlined above, each ASIC 115A-D is coupled to each ASIC in each cloud switch in a tier above using one lane of a multi-lane cable for each ASIC 115A-D. Thus, in cable interconnections 155, sixteen (16) multi-lane cables (or a multiple thereof) are used to physically connect cloud switch 110A to each cloud switch 120A-D. Logically, using the multi-lane cables, each ASIC 115A-D is connected to an ASIC in cloud switches 120A-D. The additional cloud switches 110B-D also each have sixteen (16) multi-lane cables (or a multiple thereof) coupling each cloud switch 110B-D to cloud switches 120A-D in the second tier.

It should be appreciated that, in this configuration, each multi-lane cable replaces four (4) single lane cables in a conventional approach. The specifics of the physical connections between switches and the logical connections between ports in ASICs on each tier are discussed with the descriptions of FIGS. 2-7 below.

Figure 2:
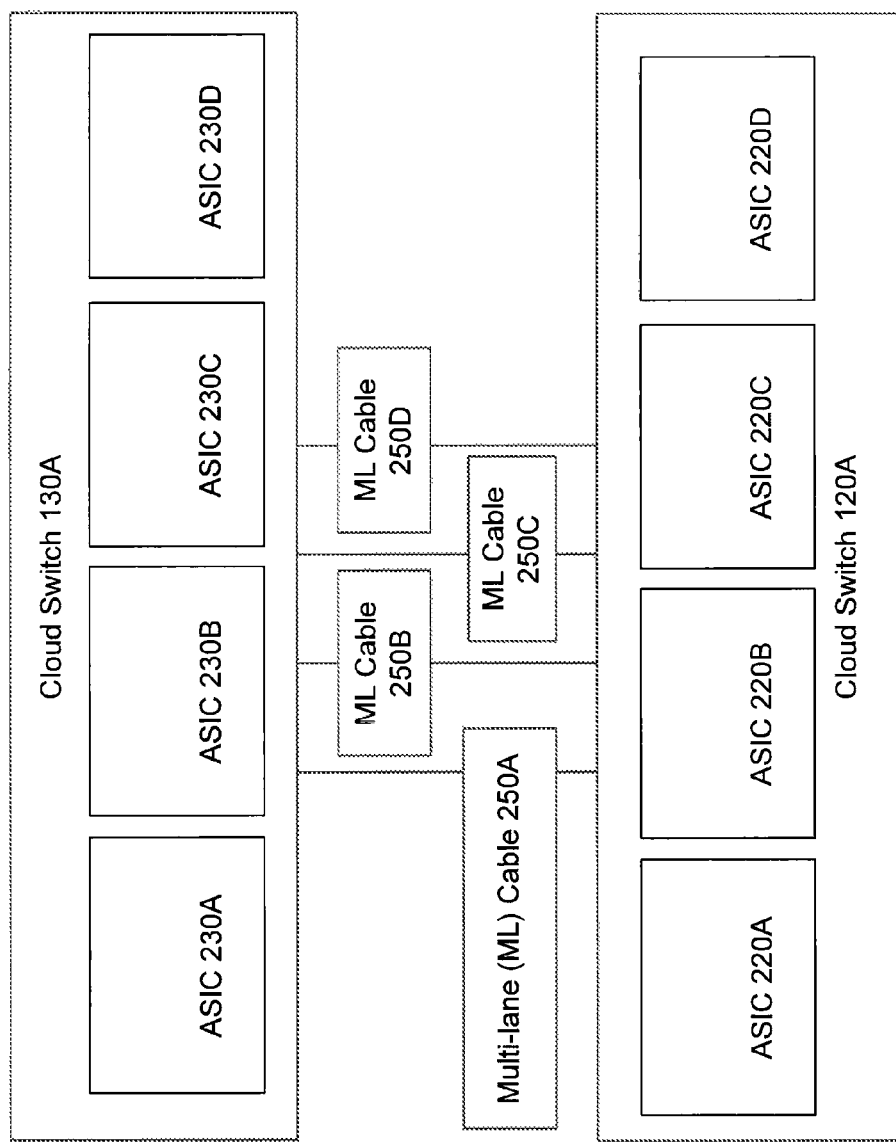
FIG. 2 is a block diagram of cloud switches having application specific integrated circuits (ASICs) coupled using multi-lane cables, according to an embodiment.

FIG. 2 is a block diagram of network topology 200 having two cloud switches coupled using multi-lane cables. Cloud switches 120A and 130A have respective ASICs 220A-D and 230A-D coupled using four multi-lane cables 250A-D. passive cables 250A-250D are used to implement four (4) physical cable connections between cloud switches 120A and 130A. In a conventional approach, sixteen (16) cables would be required to link each ASIC 220A-D with each ASIC 230A-D in the network tier above.

Figure 3A:
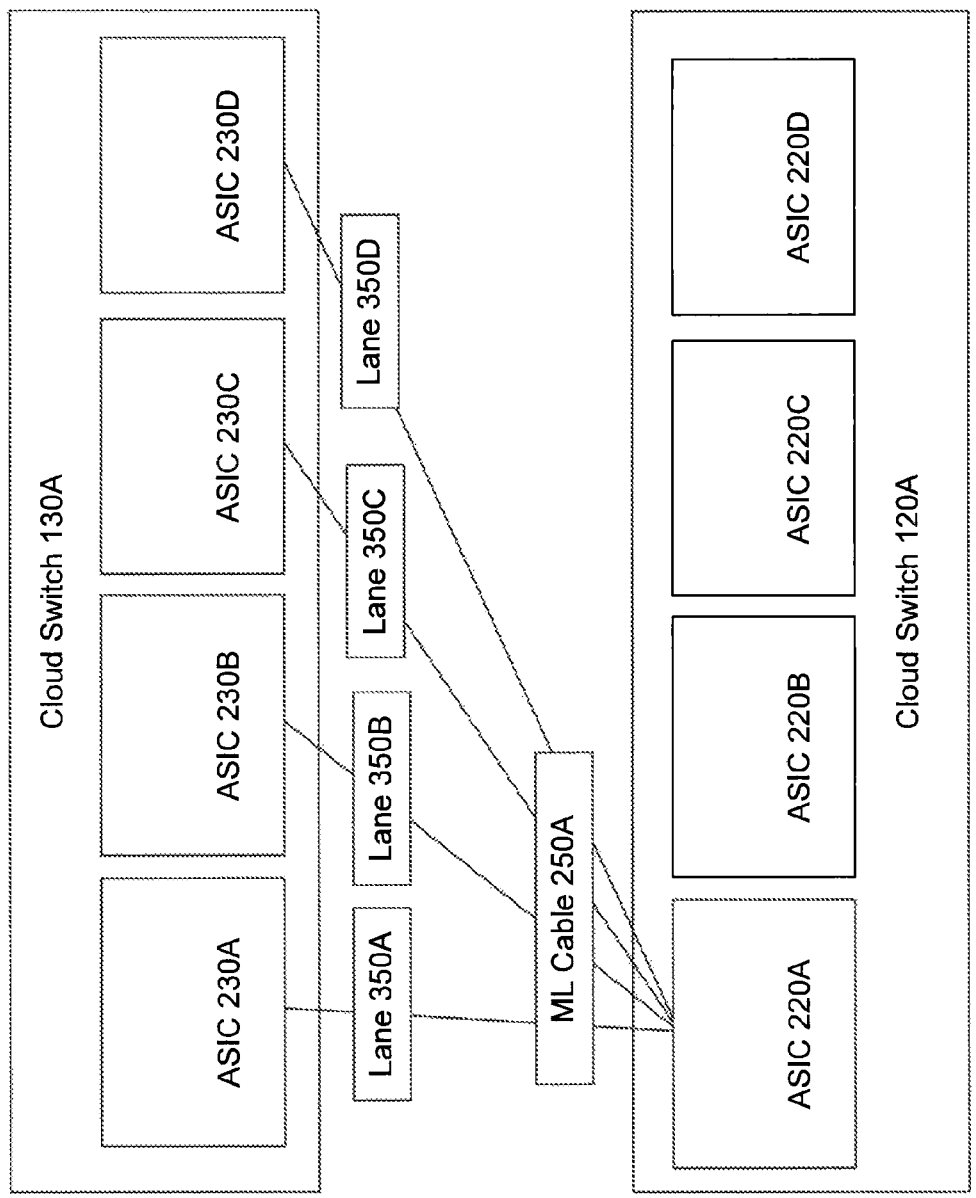
FIG. 3A is a block diagram showing ASICs selectively wired to individual data lanes of a multi-lane cable, according to an embodiment.

FIG. 3A is a block diagram showing four (4) data lanes of a multi-lane cable coupling cloud switches having ASICs. Network topology 300 shows cloud switch 120A coupled to cloud switch 130A via cable 250A. Cloud switch 120A has ASICs 220A-D and cloud switch 130A has ASICs 230A-D. Cable 250A has four data lanes 350A-D coupling ASIC 220A to ASIC 230A-D respectively.

It is important to note that multi-lane cable 250A is a single multi-lane cable coupling cloud switch 120A to 130A. Network traffic traversing ASIC 220A can be routed to ASICs 230A-D using multi-lane cable 250A. Typically, ASICs 220B-D would also be connected to ASICs 230A-D using additional multi-lane cables coupled in an approach similar to multi-lane cable 250A and lanes 350A-D.

Internal logic within each cloud switch allows multi-lane cable 250A to couple ASIC 220A to ASICs 230A-D in an asymmetrical connection. Though the cable connections are "box to box," internally, the single physical connection to ASIC 220A in cloud switch 120A is linked to ASICs 230A-D in cloud switch 130A. As further discussed with the description of FIG. 5 below, this asymmetric coupling is accomplished by using multi-lane cable 250A to link specific ports in each coupled ASIC. One having skill in the relevant art(s), given the description herein, will recognize this asymmetrical connection as a "striped" connection between ASIC 220A and ASICs 230A-D.

It is also important to note that, in typical embodiments of cloud switches 120A and 130A there is no local connectivity (also termed "local switching") between the ASICs in a cloud switch. For example, ASIC 220A and ASIC 220B cannot directly connect to each other in a single hop. Connectivity can be achieved by a route going up from ASIC 220A to ASIC 230B in cloud switch 130A on the tier above and going down to ASIC 220B via a multi-lane cable coupled to ASIC 230B.

Figure 3B:
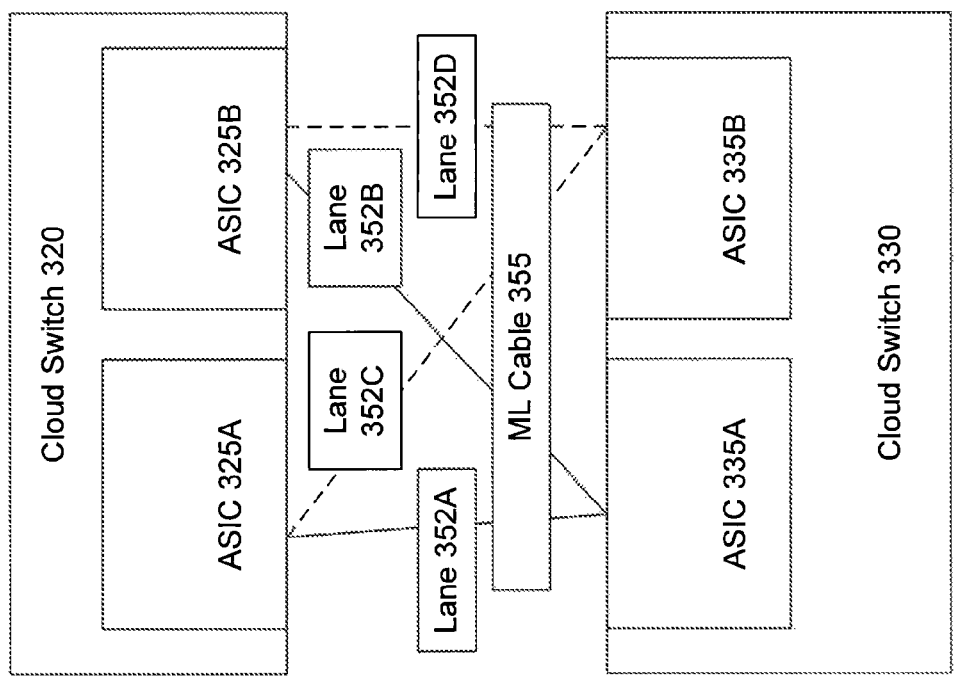
FIG. 3B is a block diagram showing data lanes of a multi-lane cable coupling cloud switches having two application specific integrated circuits (ASICs), according to an embodiment.

FIG. 3B is a block diagram showing another example of coupled cloud switches in a network topology. Network topology 400 has two cloud switches 320 and 330 having ASICs 325A-B and 335A-B respectively. Cloud switches 320 and 330 are coupled by a multi-lane cable 335. Multi-lane cable 335 has four (4) transmission lanes 352A-D. ASIC 335A uses lanes 352A-B to couple with ASIC 325A-B respectively. ASIC 335B uses lanes 352C-D to couple with ASIC 325A-B respectively.

The savings associated with use of cloud switches 320 and 330 are illustrated by FIG. 3B. Connector and cable savings of a factor of four (4) are achieved using four-lane QSFP connectors and two (2) ASICs per box as shown.

Figure 4:
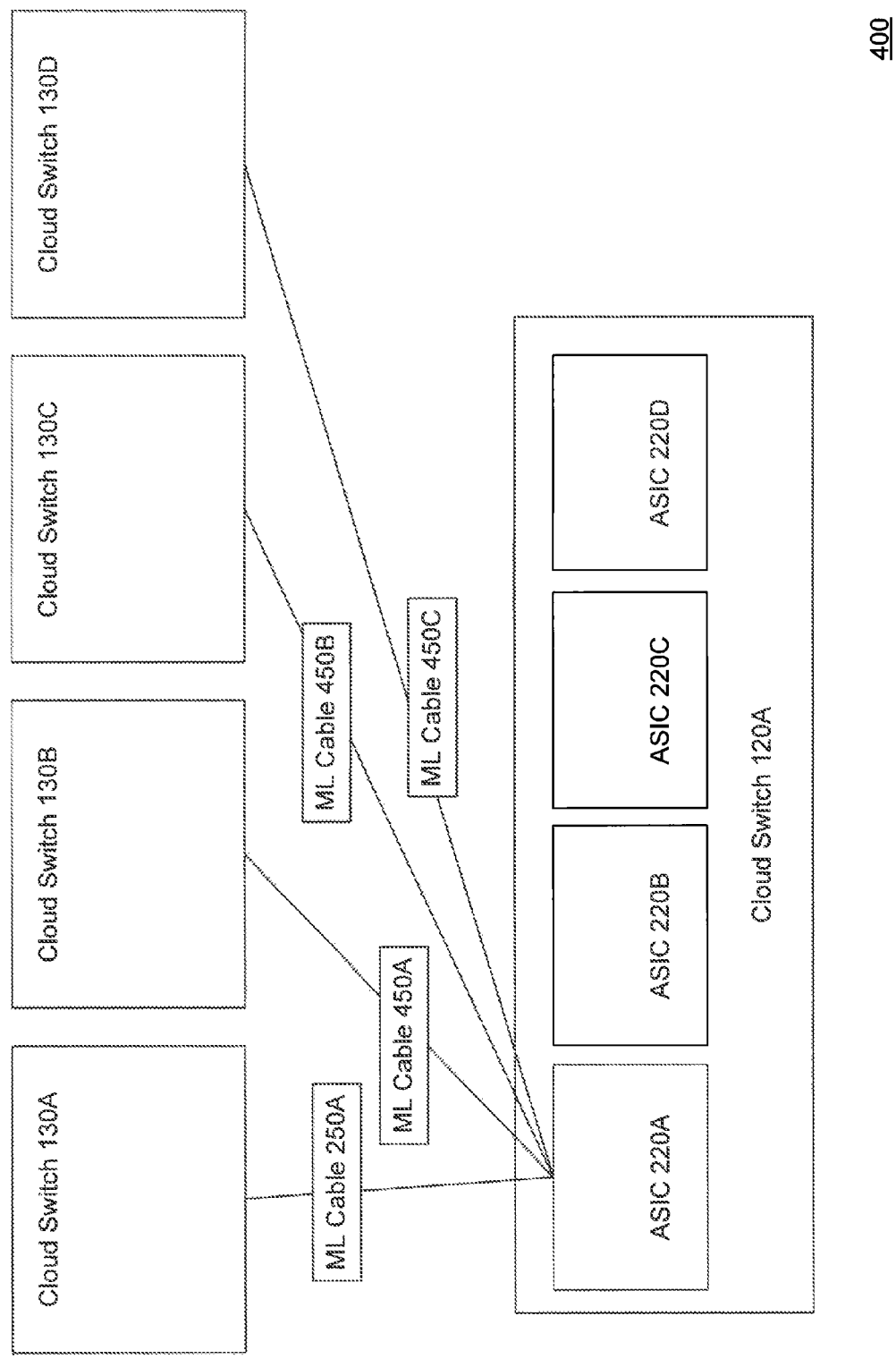
FIG. 4 is a block diagram of a cloud switch on a first tier coupled to multiple cloud switches on a second tier using multi-lane cables, according to an embodiment.

FIG. 4 is a block diagram of a cloud switch on a first tier coupled to multiple cloud switches on a second tier using multi-lane cables. Network topology 400 shows cloud switch 120A coupled to cloud switches 130A-D via cables 250A and 450A-C. Cloud switch 120A has ASICs 220A-D. ASIC 220A is coupled to cloud switches 130A-D via cables 250A, 450A, 450B and 450C respectively.

Multi-lane cables 450A-C in FIG. 4, show additional multi-lane cables used to connect ASIC 220A to the ASICs of each cloud switch 130B-D in a higher tier (ASICs not shown). Also not shown in FIG. 4, three (3) additional multi-lane cables are used for each ASIC 220B-220D to also couple cloud switch 120A to the ASICs of cloud switches 130A-D. In all, 16 cables with 64 data lanes couple the four (4) ASICs 220A-D of cloud switch 120A and the 16 ASICs of cloud switches 130A-D. Typically, additional cloud switches would be included at the same tier-level as cloud switch 120A.

Figure 5:
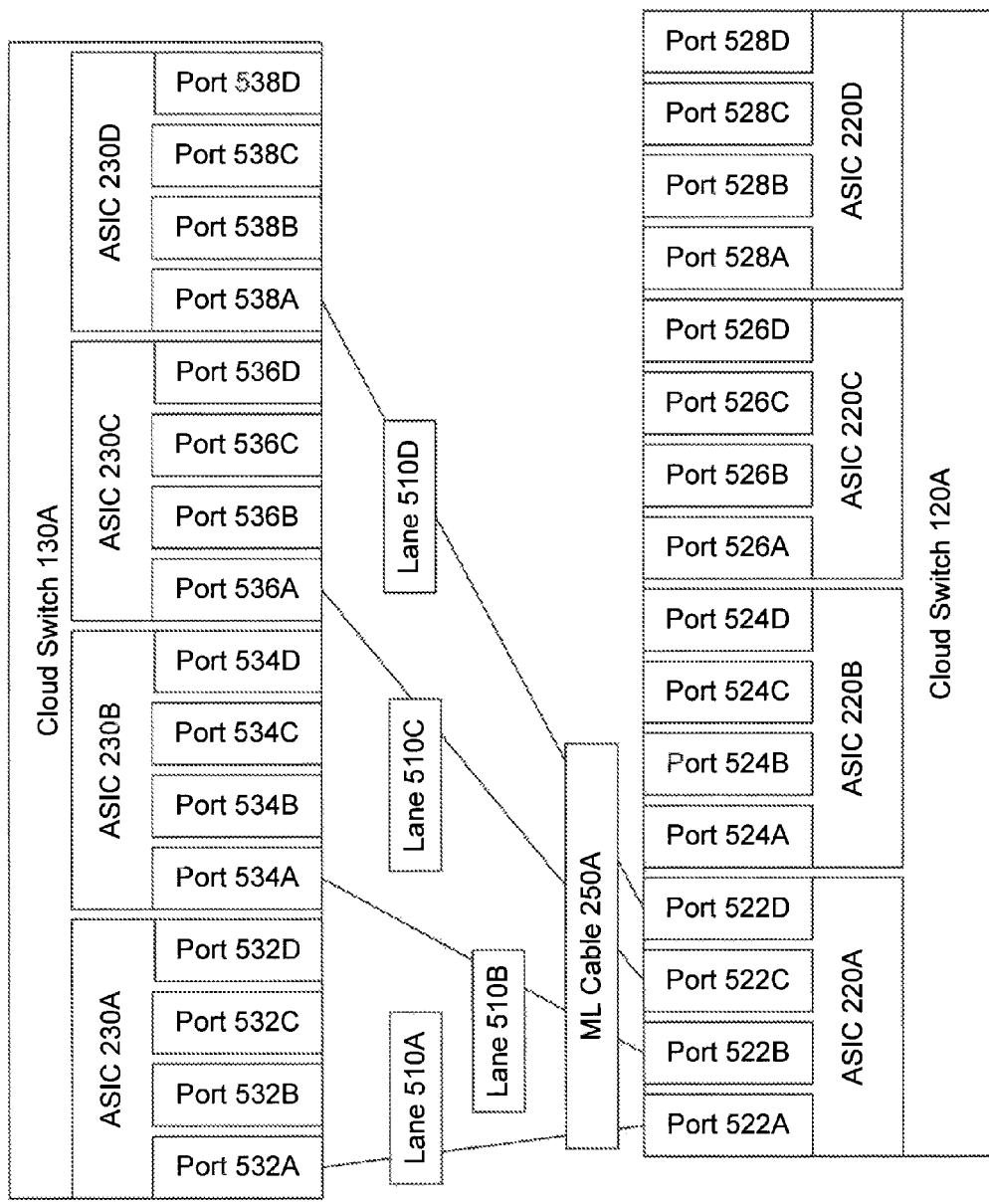
FIG. 5 is a block diagram of a cloud switch network where the lanes of a multi-lane cable are striped across different ASICs in one of the cloud switches, according to an embodiment.

FIG. 5 is a block diagram showing data lanes between ports in a coupling of two cloud switches using a multi-lane cable. Network topology 500 has cloud switch 120A coupled to cloud switch 130A using a cable having lanes 510A-D. Cloud switch 120A has ASICs 220A-D and cloud switch 130A has ASICs 230A-D. ASIC 220A has ports 522A-D ASIC 220B has ports 524A-D, ASIC 220C has ports 526A-D, ASIC 220D has ports 528A-D, ASIC 230A has ports 532A-D, ASIC 230B has ports 534A-D, ASIC 230C has ports 536A-D, ASIC 230D has ports 538A-D. Lane 510A couples port 522A of ASIC 220A to port 532A of ASIC 230A. Lane 510B couples port 522B of ASIC 220A to port 534A of ASIC 230B. Lane 510C couples port 522C of ASIC 220A to port 536A of ASIC 230C. Lane 510D couples port 522D of ASIC 220A to port 538A of ASIC 230D.

As shown on FIG. 5, cloud switch 120A uses a multi-lane cable with lane configurations 510A-D that are "striped." As would be appreciated by one having skill in the relevant art(s), given the description herein, a "striped" multi-lane cable approach links port 522A of ASIC 220A to port 532A in ASIC 230A, and port 522B of ASIC 220A to port 534A in ASIC 230B. An opposite, "direct" approach to cabling is discussed with the description of FIG. 6 below.

The striped approach depicted on FIG. 5 uplinks consecutive ports in ASIC 220A in cloud switch 120A to equivalent ports across consecutive ASICs 230A-D in higher tier cloud switch 130A. As discussed with the description of FIGS. 6, 7 and 10 below, embodiments of cloud switches discussed herein, can be configured to use either striped or direct cable connections between tiers. As discussed below, and shown in FIG. 10, "passive cards" can be used by an embodiment to set the direct or striped configurations discussed herein.

In another example, each ASIC 220A-D has eight ports. Four ports (522A-D) are facing "up" towards ASICs 230A-D in a higher tier and are termed "uplink" links, and four "downlink" ports are facing "down" to a lower tier (not shown). As shown on FIG. 5, uplink ports 522A-D are striped to cloud switch 130A above. As described with FIG. 6 below, the four example downlink ports can have a direct connection to a lower tier.

Exemplary embodiments of cloud switches 120A, 130A have either two ASICs per cloud switch (as depicted in FIG. 3B) or four ASICs per cloud switch (as depicted in FIGS. 1, 2, 3A, 4, 5 and 6). In different embodiments, the number of ports per ASIC 220A-D is much larger, e.g., 64 ports per ASIC. The only constraint on the total number of ports per ASIC is based on efficiency, e.g., some ports may not be used because of different configurations. In an embodiment, the number of ports per ASIC is a multiple of the number of ASIC per cloud switch.

Figure 6:
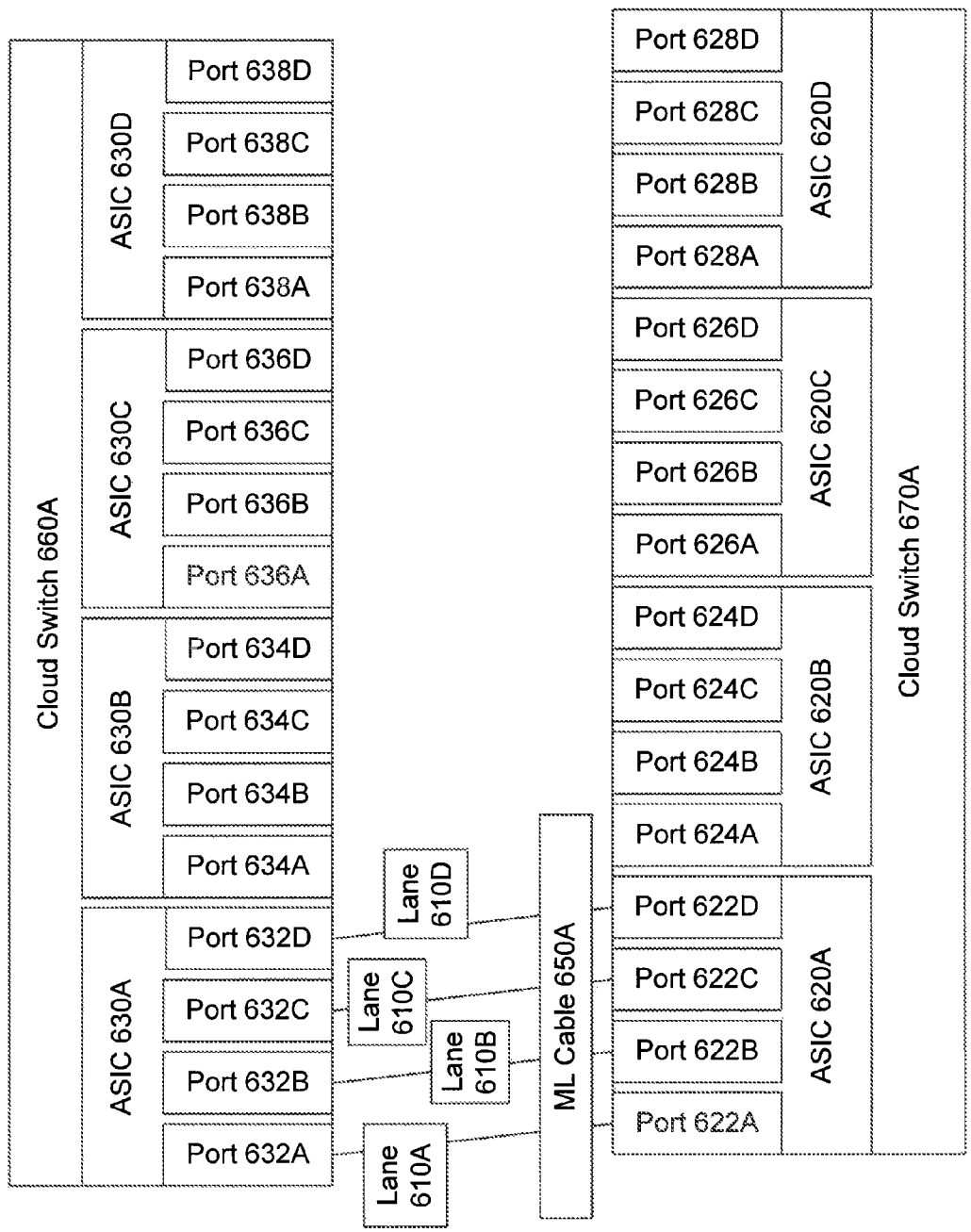
FIG. 6 is a block diagram of a cloud switch network where the lanes of a multi-lane cable are directly connected to the corresponding ASICs across interconnected cloud switches, according to an embodiment.

FIG. 6 is another block diagram showing data lanes between ports in a coupling of two cloud switches using a multi-lane cable. Network topology 600 has cloud switch 670A coupled to cloud switch 660A using a different example cable interconnections 680, the additional example fabric having a multi-lane cable with lanes 610A-D. Cloud switch 670A has ASICs 620A-D and cloud switch 660A has ASICs 630A-D. ASIC 620A has ports 622A-D, ASIC 620B has ports 624A-D, ASIC 620C has ports 626A-D, ASIC 620D has ports 628A-D. ASIC 630A has ports 632A-D, ASIC 630B has ports 634A-D, ASIC 630C has ports 636A-D, ASIC 630D has ports 638A-D. Lane 610A couples port 622A of ASIC 620A to port 632A of ASIC 630A. Lane 610B couples port 622B of ASIC 620A to port 632B of ASIC 630A. Lane 610C couples port 622C of ASIC 620A to port 632C of ASIC 630A. Lane 610D couples port 622D of ASIC 620A to port 632D of ASIC 630A.

In the example network coupling shown in FIG. 6, ASIC 620A is not coupled to each ASIC 630A-D in cloud switch 660A. This direct cable configuration of a multi-lane cable shows an alternate approach to coupling ASICs between cloud configurations.

Figure 7:
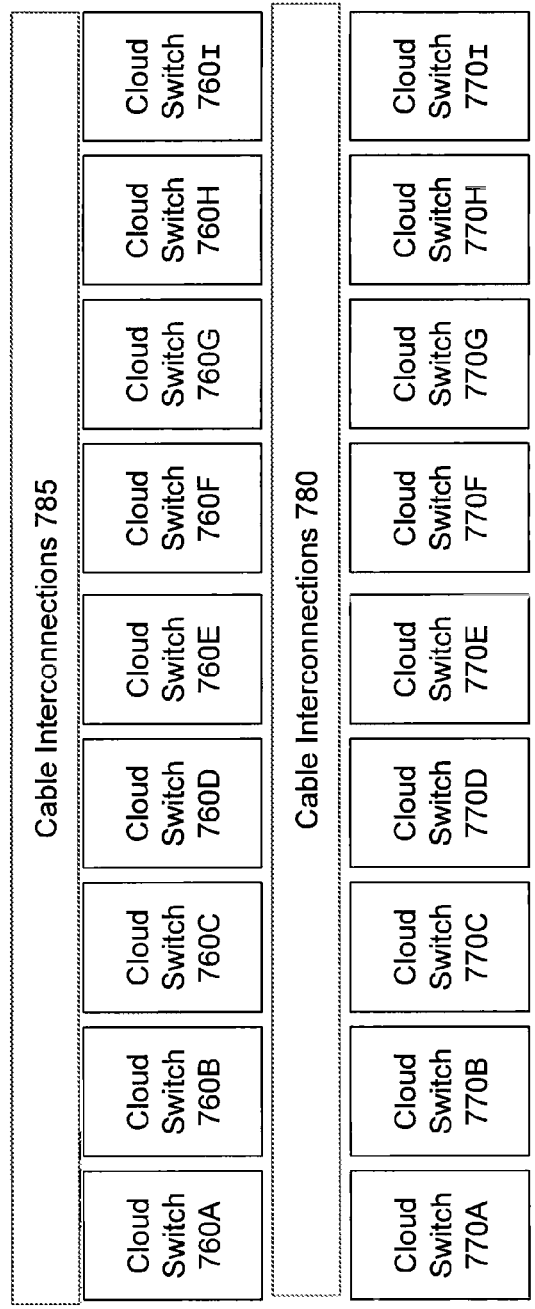
FIG. 7 is a block diagram of two tiers of cloud switches coupled by cable interconnections, according to an embodiment.

Cloud switches 660A and 670A can be configured for either approach, both on their uplink connections to an upper tier and their downlink connections to lower tiers. For example, cloud switch 660A can be configured for a direct downlink connection from cloud switch 670A on one set of ports, but on uplink ports (not shown), a striped connection (as shown in FIG. 5) can be used to connect to a cloud switch at a higher tier. FIG. 7 below shows a view of this type of multiple tier network.

Based on the descriptions herein, one having skill in the relevant art(s) would appreciate that an embodiment allows the use of a multi-lane cable plant while retaining a total network size as a single lane cable plant was used. For example, in 10G and 40G networks, having a four lane multi-lane cable plant reduces the network size by four for every network tier. A three-tier network, for example, would be 64 times smaller.

By using cloud switches with this type of configuration flexibility, networks can be tuned to optimize link speed vs. total network size using the same flexible cloud switch building block.

Organization of Cloud Switches in a Network

FIG. 7 is a block diagram of two tiers of cloud switches coupled by cable interconnections. Network topology 700 has a first tier of cloud switches 770A-I coupled to a second tier of cloud switches 760A-I using cable interconnections 780. Cloud switches 770A-I are composed of ASICs, each ASIC coupled to cloud switches 760A-660I using multi-lane cables in cable interconnections 780. Cable interconnections 785 couples the second tier of cloud switches to a third tier of cloud switches (not shown).

Based on the configurations of the cloud switches 770A-I and 760A-I of the first and second tiers respectively, cable interconnections 780 can have either a direct or a striped configuration. Additional tiers can also be added to network topology 700 having different cable interconnection configurations, to create a multi-tier network constructed out of cloud switches with alternating cabling configurations. Cloud switches can be configured to use either direct or striped connections. For example, switches 760A-I can use a striped scheme with cable interconnections 780 connecting to a lower switch tier, while using a direct scheme with cable interconnections 785 connecting to the higher switch tier. One having skill in the relevant art(s), given the description herein, would appreciate the different combinations that are available.

One approach used to configure cable interconnections 780 to be an uplink direct connection between cloud switches 770A-I and cloud switches 760A-I, uses plug-in passive cards in both cloud switches 770A-I and cloud switches 760A-I. Cloud switches 770A-I each have a passive card that configures their uplink ports to directly couple to ports in cloud switches 760A-I using multi-lane cables. This direct connection is discussed with the description of FIG. 6, where multi-lane cable 650A couples ports 622A-D in ASIC 620A to ports 632A-D in ASIC 630A.

To accept this direct uplink from cloud switches 770A-I, in this approach, cloud switches 760A-I each have a passive card that configures their downlink ports to accept the direct connections from cloud switches 770A-I. These passive cards in each cloud switch 760A-I can also be used to configure the uplink ports of cloud switches 760A-I, thereby configuring cable interconnections 785. A passive card used in a cloud switch can specify a direct connection for downlink ports and a direct connection for uplink ports. Another passive card can specify striped connections for both uplink and downlink.

Cloud Switch Components

Figure 8:
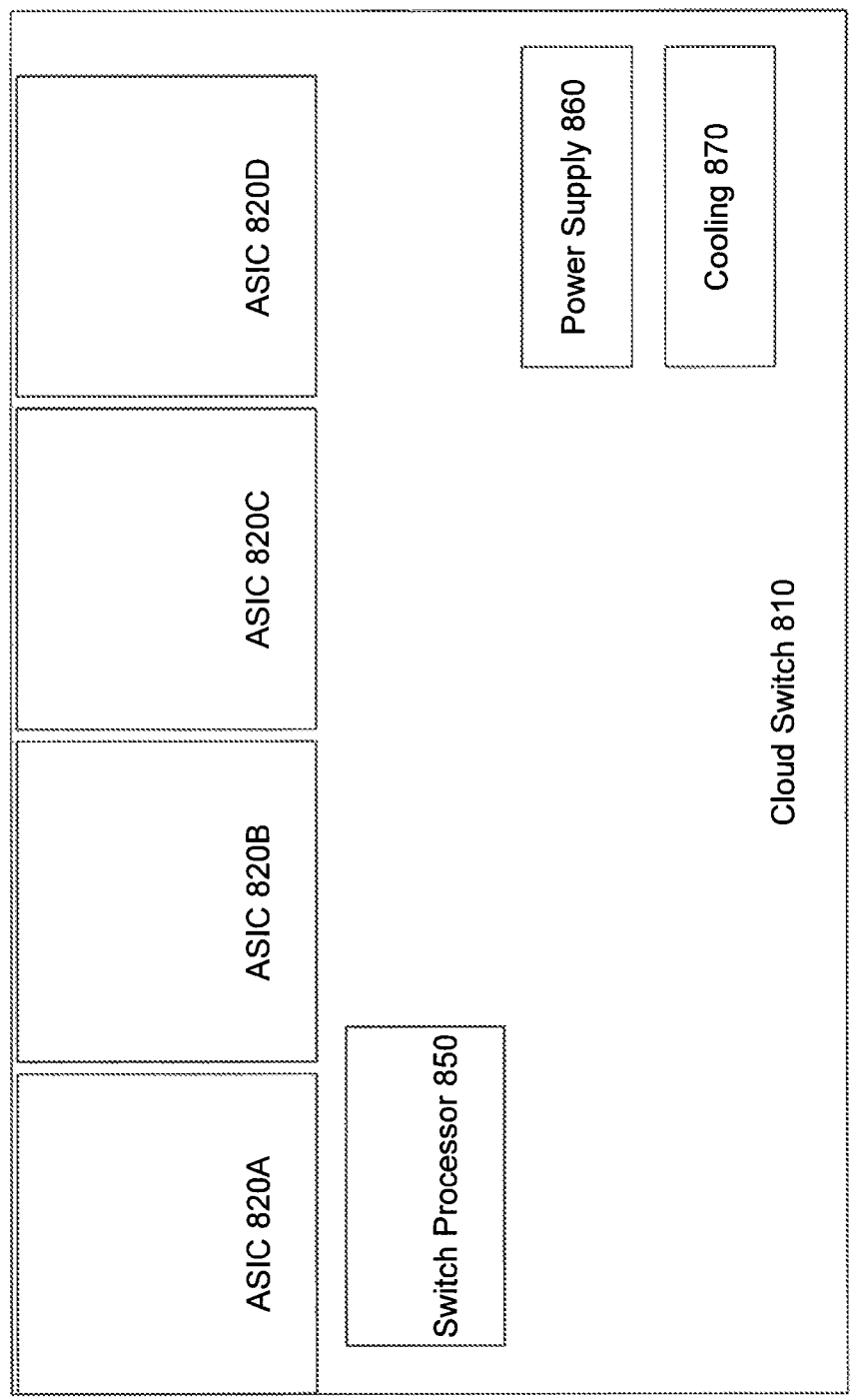
FIG. 8 is a block diagram showing several components of a cloud switch, according to an embodiment.

FIG. 8 is a block diagram showing several components of a cloud switch, according to an embodiment. Cloud switch 810 has ASICs 820A-D, switch processor 850, power supply 860 and cooling 870.

As noted in the background above, one challenge of a conventional approach to scalable networks is the cost associated with the large number of switch boxes deployed. This cost relates to the acquisition costs and management costs of a large number of boxes. A very granular deployment of switches is inefficient in the sense that many fixed costs like enclosures, fans, and power supplies are unnecessarily replicated across low density boxes instead of amortized across more switch ASICs and connectors in denser boxes. One benefit of using cloud switch 810 having ASICs 820A-D, is the reduction in the total number of boxes associated with a given deployment without degrading other network attributes.

As also noted above, when compared to a conventional network, each ASIC 820A-D replaces a discrete switch box in the network. Sharing component functions such as power supply 860, cooling 870 and switch processor 850 in a single cloud switch 810, can lead to simpler management, and power savings during operation.

Routing Instances

Figure 9:
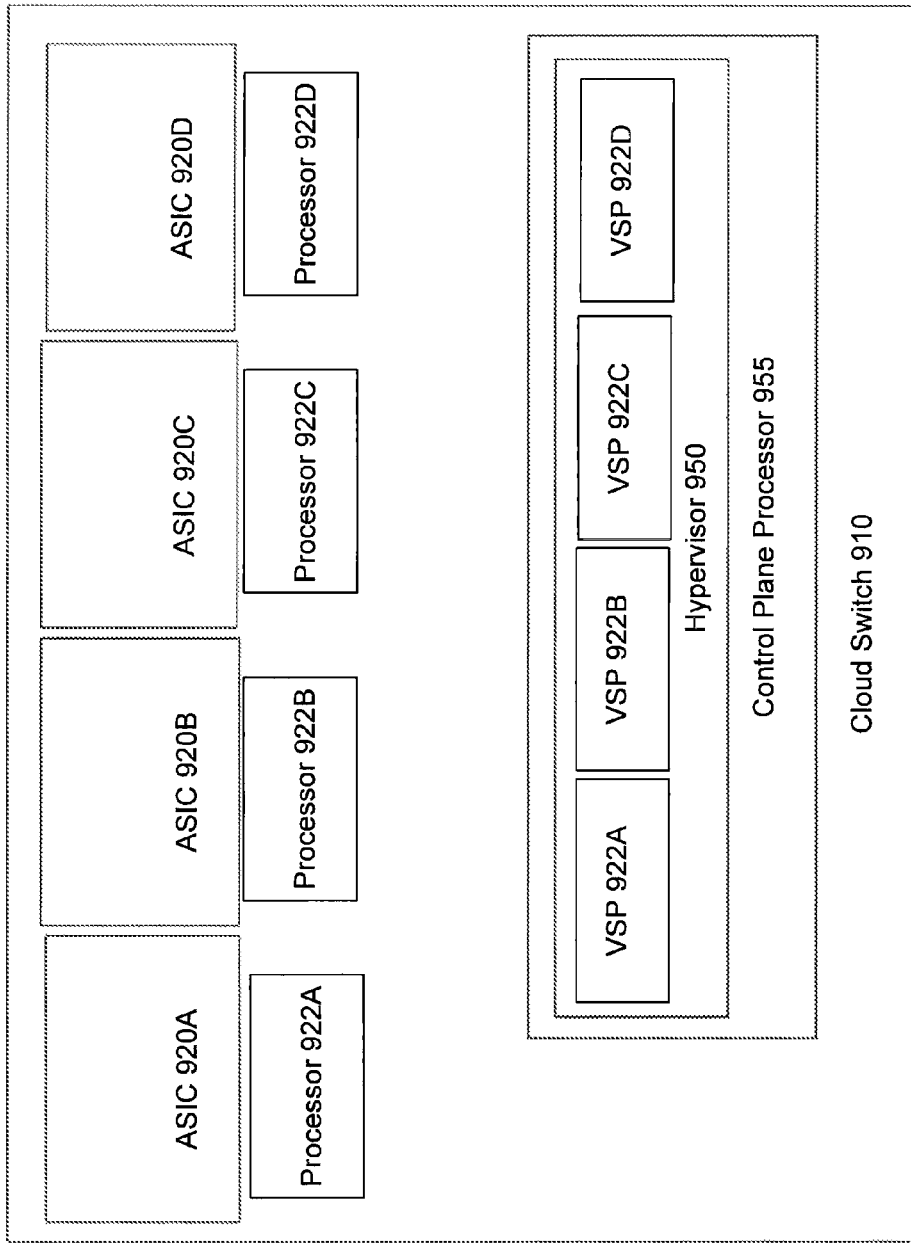
FIG. 9 is a block diagram of a cloud switch having multiple processors, according to an embodiment.

FIG. 9 is a block diagram showing additional components of a cloud switch, according to an embodiment. Cloud switch 910 has ASICs 920A-D, control plane processor 955. Control plane processor has hypervisor 950, and each ASIC 920A-D has a respective processor 922A-D associated with each ASIC sub-switch. Hyper visor 950 has virtualized switch processors (VSP) 922A-D corresponding to ASIC 920A-D respectively.

In an embodiment, routing computations in cloud switch 910 can be divided into separable and fully independent routing tasks. FIG. 9 shows two approaches to this division. One approach to dividing these tasks is to separate them into software tasks for each ASIC of the cloud switch. In FIG. 9, one set of routing tasks is maintained in respective processors 922A-D for each ASIC 920A-D.

One approach to managing the separated routing tasks, is to map them to different routing instances for each ASIC 920A-D. An example of a routing instance protocol used by conventional switches and some embodiments is an Open Shortest Path First (OSPF) protocol.

Switch instances can be managed in a cost optimized fashion by using one processor per ASIC 920A-D to manage routing instances for the ASIC. In this approach, one or more virtual switch processors (VSP) 922A-D can manage respective ASICs 920A-D in cloud switch 910. On one embodiment, a managing processor (also termed a "primary routing processor) can be used by administrative utilities to manage the other ASICs and cloud switch 910 generally.

A control plane processor 955 can compute and maintain routing instances for ASICs 920A-D in cloud switch 910. Hypervisor 950 virtualizes the operation of each ASIC 920A-D as virtualized switches and maintains separate routing instances for each. Each virtualized switch can be operated using a different embedded/switch operating system.

Hypervisor 950 based virtualization can be used to improve recovery from errors and the impact of software defects within routing instances can be better contained. Similar benefits can accrue from having routing tasks performed for each ASIC 920A-D by respective associated processors 922A-D.

It is important to note that, the above approaches of having discrete control processors 922A-D, and using control plane processor 955 with hypervisor 950 are generally not both used in the same cloud switch as shown in FIG. 9. One or the other is selected for use in a cloud switch based on implementation specific decisions.

Cloud Switch

FIG. 10 is a block diagram of a cloud switch 1000 having a chassis 1010, and ASICs 1020A-B coupled to passive card 1030 by midplane connector 1035. ASICs 1020A-B have respective ports 1025A-B. As discussed above with FIGS. 1-9, cloud switch 1000 has multiple ASICs 1020A-B and a passive card to configure port connections to adjacent tiers. Ports 1020A-B are configured to couple to multi-lane cables. In an embodiment, passive card 1030 is a plug-in card that has a printed circuit board (PCBs) with switch logic.

Mezzanine PHYs 1028A-B enable the respective coupling of ports 1025A-B to ASICs 1020A-B. Settings associated with mezzanine PHYs 1028A-B can configure the use of ports 1025A-B by ASICs 1020A-B. A combination of passive card 1030 and mezzanine PHYs 1020A-B can also be used by an embodiment to configure ports 1025A-B.

An embodiment of passive card 1030 uses trace logic to configure the port connections of ASICs 1020A-B. As noted above with FIGS. 1-9, cloud switch 1000 uses passive card 1030 to configure the port connections to adjacent tiers. In some embodiments, two types of passive card 1030 can be plugged in to cloud switch 1000: striped to striped and direct to striped. For example, with a striped to striped passive card installed, ports 1025A receive data from a multi-lane cable with a striped configuration (as shown in FIG. 5) and ports 1025B send out data using a multi-lane cable with a striped configuration. In another example, with a striped to direct passive card installed, ports 1025A receive data from a multi-lane cable with a striped configuration and ports 1025B send out data using a multi-lane cable with a direct configuration (as shown in FIG. 6).

Method 1100

This section and FIG. 11 summarizes the techniques described herein by presenting a flowchart of an example method of transferring data in a network. Such method is not meant to be limiting.

As shown in FIG. 11, method 1100 begins at stage 1110 where data is received at a sub-switch of a first bundled switch having a plurality of sub-switches configured to only couple to connections external to the first bundled switch. In an embodiment, ASIC 220A of cloud switch 120A on FIG. 3A receives data. ASIC 220A is not configured to be coupled to ASIC 220B. In different embodiments, this data can originate from different sources. One source can be another cloud switch. For example, in FIG. 1, cloud switch 120A receives data from cloud switch 110A via cable interconnections 155. Once stage 1110 is complete, method 1100 proceeds to stage 1120.

At stage 1120, the data is transferred from the first bundled switch using a multi-lane cable coupled to a second bundled switch, a first end of the multi-lane cable coupled to a sub-switch in the first bundled switch and a second end of the multi-lane cable coupled to at least two sub-switches in the second bundled switch. In an embodiment, data from ASIC 220A in cloud switch 120A is transferred to cloud switch 130A using ML cable 250A. Each lane of multi-lane cable coupled to ASIC 220A is coupled to respective ASICs 230A-D on cloud switch 130A. Once step 1120 is complete, method 1100 ends.

Cloud Switch Implementation

The switch functions herein can be implemented in hardware, software, or some combination thereof. Example functions performed by embodiments that can be performed by hardware, software, or some combination thereof include switch routing functions.

As will be appreciated by one having skill in the relevant arts, given the description herein, hypervisor 950 and processors 922A-D functions, for example, can be implemented using computer processors, computer logic, application specific circuits (ASIC), etc. Accordingly, any processor that performs functions for cloud switches described herein is within the scope and spirit of the present invention.

Further, the functions described herein could be embodied by computer program instructions that are executed by a computer processor or any one of the hardware devices listed above. The computer program instructions cause the processor to perform the functions described herein. The computer program instructions (e.g., software) can be stored in a computer usable medium, computer program medium, or any computer-readable storage medium that can be accessed by a computer or processor. Such media include a memory device such as a RAM or ROM, or other type of computer storage medium such as a computer disk or CD ROM, or the equivalent. Accordingly, any computer storage medium having computer program code that cause a processor to perform the data collection, policy management, coordination, analysis functions and other related functions described herein are within the scope and spirit of the present invention.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A bundled switch, comprising:
   a plurality of sub-switches having ports, wherein one of the plurality of sub-switches is configured to couple to a multi-lane cable having a first lane and a second lane, wherein the multi-lane cable is coupled to a second bundled switch having a second plurality of sub-switches and external to the bundled switch, and wherein the first lane is coupled to a first sub-switch in the second plurality of sub-switches and the second lane is coupled to a second sub-switch in the second plurality of sub-switches.

2. The bundled switch of claim 1, wherein a number of lanes in the multi-lane cable corresponds to a number of sub-switches in the plurality of sub-switches.

3. The bundled switch of claim 1, wherein a number of lanes in the multi-lane cable is a multiple of a number of sub-switches in the plurality of sub-switches.

4. The bundled switch of claim 1, wherein the sub-switches have P ports, and each of the P ports of one of the sub-switches is configured to be coupled to respective ones of P transmission lanes of the multi-lane cable.

5. The bundled switch of claim 1, wherein a network interface is configurable for both a direct mode and a striped mode.

6. The bundled switch of claim 1, wherein the bundled switch is a stamped switch.

7. The bundled switch of claim 1, further comprising a routing manager.

8. The bundled switch of claim 7, wherein the routing manager is a routing processor associated with the one of the plurality of sub-switches.

9. The bundled switch of claim 8, wherein the routing processor is configured to manage routing for the one of the plurality of sub-switches with which it is associated.

10. The bundled switch of claim 9, wherein the routing processor is configured to manage routing in a process isolated from routing management processes of other sub-switches in the bundled switch.

11. The bundled switch of claim 8, wherein the routing processor is a primary routing processor configured to manage routing processors associated with other sub-switches.

12. The bundled switch of claim 7, wherein the routing manager comprises a control plane processor configured to manage routing for at least two of the plurality of sub-switches.

13. The bundled switch of claim 12, wherein the control plane processor is configured to independently manage routing for the sub-switches.

14. The bundled switch of claim 12, wherein the control plane processor is configured to use a hypervisor to independently manage the sub-switches.

15. A method, comprising:
    coupling one of a plurality of sub-switches having ports in a first bundled switch to a multi-lane cable having a first lane and a second lane;
    coupling the multi-lane cable to a second bundled switch having a second plurality of sub-switches and external to the first bundled switch, wherein the first lane is coupled to a first sub-switch in the second plurality of sub-switches and the second lane is coupled to a second sub-switch in the second plurality of sub-switches; and
    routing data between the one of the plurality of sub-switches and the second bundled switch.

16. The method of claim 15, wherein a number of lanes in the multi-lane cable corresponds to a number of sub-switches in the plurality of sub-switches of the first bundled switch.

17. The method of claim 15, wherein a number of lanes in the multi-lane cable is a multiple of a number of sub-switches in the plurality of sub-switches.

18. The method of claim 15, wherein the sub-switches have P ports, and a P port of one of the sub-switches is configured to be coupled to a P transmission lane of the multi-lane cable.

19. A bundled switch, comprising:
    a plurality of sub-switches having ports, wherein one of the plurality of sub-switches is configured to couple to a multi-lane cable having a first lane and a second lane, wherein the first lane is coupled to a first sub-switch in a second plurality of sub-switches of a second bundled switch and the second lane is coupled to a second sub-switch in the second plurality of sub-switches of the second bundled switch; and a processor coupled to the one of the plurality of sub-switches, wherein the processor routes data between the one of the plurality of sub-switches and the second bundled switch.

* * * * *